United States Patent [19]

Redick

[11] Patent Number: 4,650,920
[45] Date of Patent: Mar. 17, 1987

[54] GRAPHITE FIBER THERMOCOUPLE DEVICE AND METHOD

[76] Inventor: Hugh E. Redick, 505 Hillpine Dr., Simpsonville, S.C. 29681

[21] Appl. No.: 759,157

[22] Filed: Jul. 26, 1985

[51] Int. Cl.$^4$ ............................................. H01L 35/14
[52] U.S. Cl. ............................................................ 136/239
[58] Field of Search ............... 136/208, 230, 233, 227, 136/217, 236.1, 239, 228; 264/29.2, 344

[56] References Cited

U.S. PATENT DOCUMENTS

| | | | |
|---|---|---|---|
| 885,430 | 4/1908 | Bristol | 136/228 |
| 2,152,153 | 3/1939 | Ridgway | 136/228 |
| 2,946,835 | 7/1960 | Westbrook et al. | 136/239 |
| 3,305,405 | 2/1967 | Jamieson | 136/232 |
| 3,343,373 | 9/1967 | Henderson et al. | 136/236.1 |
| 3,391,030 | 7/1968 | Beaver et al. | 136/236.1 |
| 3,919,387 | 11/1975 | Singer | 264/29.2 |

Primary Examiner—John F. Terapane
Assistant Examiner—T. J. Wallen
Attorney, Agent, or Firm—Cort Flint

[57] ABSTRACT

A thermocouple device (A, B) and method having first and second thermoelectric elements for producing a Seebeck voltage effect for measuring high temperatures wherein the first thermoelectric element consists of a first graphite fiber strand, (10,24) and the second thermoelectric element consists of a second graphite fiber strand (12,26). The graphite fibers of the first and second strands and have different thermoelectric characteristics by virtue of different generic precursors and processes from which fibers are derived. In a preferred embodiment, the first graphite fibers are derived from a pitch precursor process, and the second graphite fibers are derived from a PAN precursor process.

19 Claims, 4 Drawing Figures

GRAPHITE FIBER THERMOCOUPLE DEVICE AND METHOD

BACKGROUND OF THE INVENTION

The invention relates to thermocouple devices used in measuring high temperatures. A thermocouple is defined as a device consisting of two dissimilar materials (usually metals) which when joined together generate a predictable voltage based on the temperature of their junction.

Work with carbon (carbon and graphite are used interchangeably) thermocouples has been recorded as early as 1881 continuing to the present. These early thermocouples evolved to the type described by Westbrook and Shepard, as in U.S. Pat. No. 2,946,385, whereby a graphite/graphite with an additive or doping agent thermocouple was made. The doping agent, boron, made a graphite of sufficient electrical valence difference that when joined with the undoped graphite a measureable Seeback voltage was created. Thermocouples have been described in *Physiochemical Measurements at High Temperatures,* 1959, Bockres, White, McKenzie, where the doping agent was clay. Thermocouples of this type suffer from inhomogenity, nonuniformity, and instability. Due to the low strength of the carbon materials, the physical size of these carbon thermocouples is much larger than typical metal thermocouples. Due to their physical size, they conduct heat away from the surroundings in which they are sensing.

A second approach to carbon thermocouples is described by Jamieson in U.S. Pat. No. 3,305,405. A material which yields graphite is pyrolized and deposited on a surface of boron nitride. A second layer of pyrolytic graphite which has seen a different heat history is then deposited. The different heat histories result in a sufficient electrical difference to generate a Seebeck voltage. This method of fabrication is difficult and batch-to-batch uniformity would be a problem.

Accordingly, an objective of the present invention is to provide a thermocouple which is stable and efficient for use in measuring high temperatures.

Another object of the present invention is to provide a thermocouple having a temperature sensing head is simple in construction and has a small mass to reduce conduction heat loss.

SUMMARY OF THE INVENTION

The above objectives are accomplished according to the instant invention by the discovery that a Seebeck effect voltage can ge obtained by joining pitch and PAN based graphite fibers. The Seebeck voltage is sufficiently high and sensitive to be used as a thermocouple. This Seebeck voltage is stable at high temperatures. The use of these fibers which are commercially available in large homogeneous lots eliminates the batch-to-batch differences inherent in previous graphite thermocouples. The use of commercially available fibers makes these graphite fiber thermocouples cost competitive with metal thermocouples. These fibers contain no doping agents which eliminates the possibility of voltage drift due to the diffusion of the doping agent at high temperatures. Due to their high strengths, graphite fiber thermocouples have been constructed which have a much reduced mass compared to previous carbon thermocouples. The reduced mass results in less heat conduction from the point of temperature measurement and reduces the complexity of the thermocouple insulating head design.

BRIEF DESCRIPTION OF THE DRAWINGS

The construction designed to carry out the invention will hereinafter be described, together with other features thereof.

The invention will be more readily understood from a reading of the following specification and by reference to the accompanying drawings forming a part thereof, wherein an example of the invention is shown and wherein.

DESCRIPTION OF A PREFERRED EMBODIMENT

The material used in making the thermocouples of this invention is carbon in the form of graphite. Graphite is the most temperature stable material known with a sublimation temperature of 4200° C.

In the decade of the 1960s it was discovered that graphite fibers could be produced by pyrolizing rayon or acrylic (PAN) fibers under specific conditions. These fibers had extremely high tensile strengths, and due to their low densities were ideally suited as the reinforcing member of composites. A large industry has developed producing graphite fibers for composites. In searching for a more economical graphite fiber, L. S. Singer discovered, as in U.S. Pat. No. 3,919,387, that a graphite fiber could be produced from a pitch containing liquid crystalline carbon (mesophase). Graphite fibers derived via the pyrolysis of PAN or rayon differ from those derived from pitch precursor in their electrothermal characteristics. Table 1 lists some of these differences.

TABLE 1

| Type Fiber/ Modulus | Density g/cm | Electrical Resistivity u-ohm-m | Thermal Conductivity cal/sec-cm K |
|---|---|---|---|
| PAN-50 msi | 1.6 | 18 | 0.16 |
| Pitch-50 msi | 1.9 | 13 | 0.25 |

Scanning electron microphotes of the cross-section of PAN and pitch fibers show a macrostructural difference with the PAN graphite fiber exhibiting little structure texture, while pitch-based fibers have a radial structure.

Figure 1:
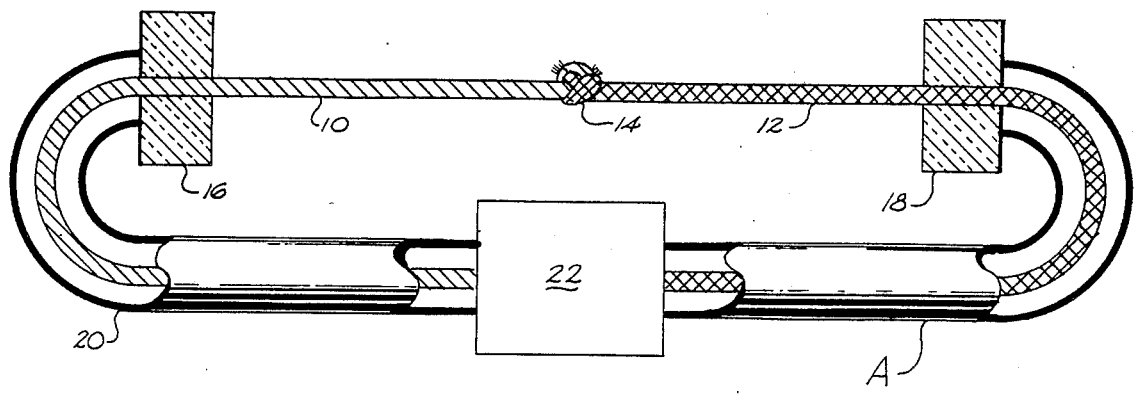
FIG. 1 is a partially cut-away schematic illustration of a graphite fiber thermocouple constructed according to invention without insulation.

Referring now in more detail to the drawings, FIG. 1 shows a graphite fiber thermocouple device A without insulation. Thermocouple A includes a strand or thread 10 of single or multiple filaments of a pitch-based graphite fibers, and a second thread or strand 12 comprised of single or multiple filaments of PAN or rayon based graphite fiber. The fibers are joined at a thermocouple junction by tying in a knot at 14. Intermingling of filaments, or use of a high temperature adhesive may also be utilized. The fiber threads 10, 12 are supported by blocks 16 and 18 which act as electrical insulation from ground. From the insulation blocks the graphite threads 10, 12 are insulated by any common insulating sheath 20 such as plastic or fiberglass until terminated at a detector means 22 for converting and reading out the electrical voltage signal as a temperature. The detector means may be any suitable device such as a potentiometer for converting the electromotive force developed by the graphite strands into a meter reading indicating temperature.

Figure 2:
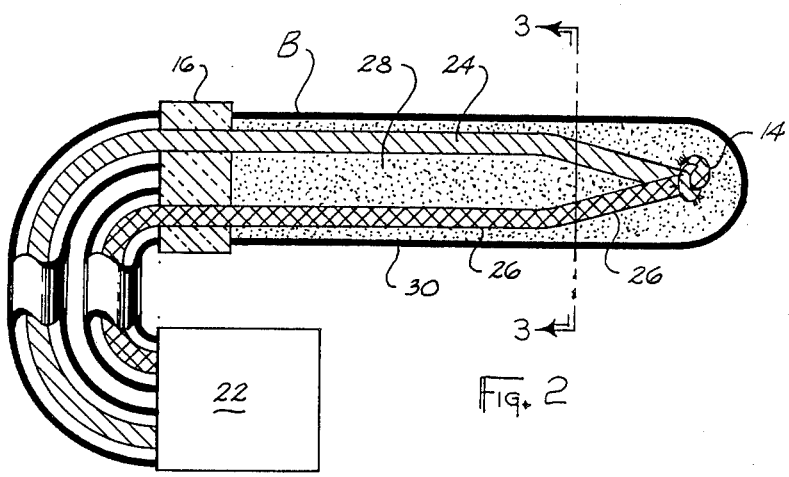
FIG. 2 is a sectional view of a graphite fiber thermocouple with insulation and an optional protection sheath in accordance with the invention.

In FIG. 2, a thermocouple B is illustrated which shows a first strand 24 consisting of monofilament or multifilament pitch graphite fiber, and a second strand 26 consisting of a monofilament or multifilament PAN or rayon graphite fiber. The graphite strands 24 and 26 are separated by an insulation material 28 which has a higher electrical resistance than graphite fibers 24, 26. The insulation may be surrounded by an elongated housing in the form a thin-wall sheath 30. The strands 10, 12 may be encapsulated in a suitable insulation material such as Coltronics 931 graphite adhesive molding compound within sheath 30. This material fixes the strands in their prescribed spacing as can best be seen in FIG. 2. An insulation material that may be used without a sheath is carbon of a higher resistance than the graphite fibers. This carbon may be molded from powder, deposited by vapor deposition, or from the polymerization of a carbon-containing material. Other insulating materials can be magnesia (Mgo), alumina (Al O), berylia (BeO), and boron nitride (BN). If a sheath is desired it can be made from molybdenum, tantalum, platinum-rhodium, or Inconel 600.

Figure 3:
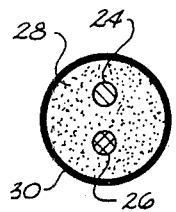
FIG. 3 is a sectional view taken along line 3—3 of FIG. 2.

FIG. 3 is a cross-sectional view of the thermocouple in FIG. 2 further illustrating the separation of the multifilament threads 24 and 26 extending longitudinally in the elongated housing 20.

Figure 4:
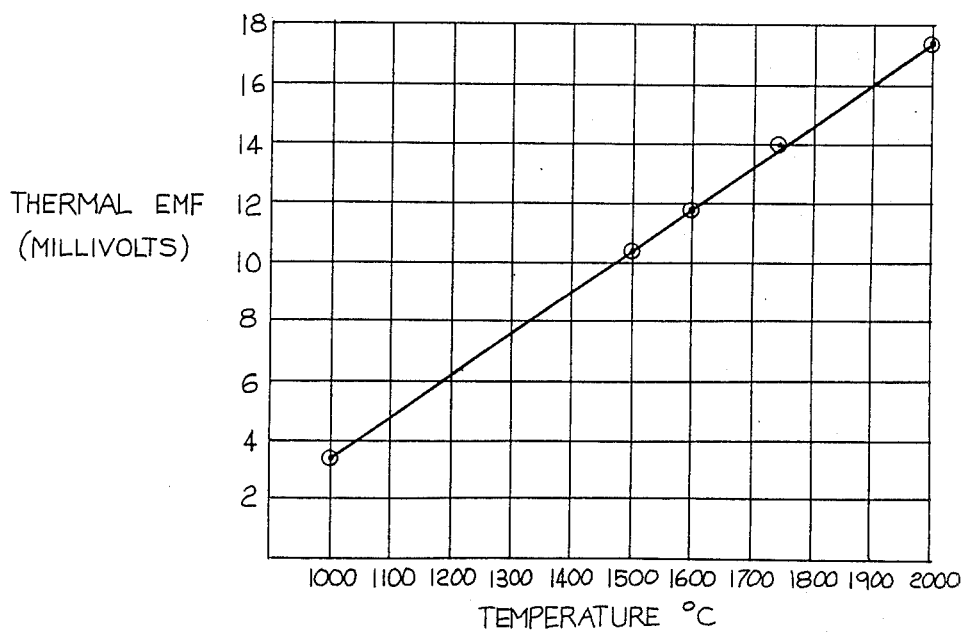
FIG. 4 is a temperature voltage graph which illustrates the performance of a graphite fiber thermocouple made in accordance with invention.

FIG. 4 is a graphical representation of the electrical output of the thermocouple described in this invention. It is an important requirement of materials used in thermocouples that their output be linear. A suitable material for the first strand 10, 24 may be a pitch graphite fiber strand, 1000 filaments, identifiable as Thornel Type P—grade V50066 manufactured by the Union Carbide Company. The second strand 12, 26 may be a PAN graphite fiber strand, 1000 filaments, identifiable as Hercules AS4 manufactured by the Hercules Chemical Company.

Thus, it can be seen that a highly advantageous termocouple can be had in accordance with the invention using a simplified construction of graphite fibers for measuring temperatures as high as 3500 degrees C. which has not been heretofore obtainable.

While a preferred embodiment of the invention has been described using specific terms, such description is for illustrative purposes only, and it is to be understood that changes and variations may be made without departing from the spirit or scope of the following claims.

What is claimed is:

1. A thermocouple device for measuring temperatures of the type which includes first and second thermoelectric elements joined together at a thermocouple junction wherein the improvement comprises:
    said first thermoelectric element including a first graphite fiber strand;
    said second thermoelectric element including a second graphite fiber strand; and
    said graphite fibers of said first and second strands having dissimilar electrothermal characteristics due to said fibers having different molecular structures derived from two hydrocarbon materials having different physical molecular structures, said dissimilar electrothermal characteristics producing a voltage dependent on the temperature at said thermocouple junction.

2. The thermocouple device of claim 1 wherein said first and second graphite fibers are derived from different generic precursors.

3. The thermocouple device of claim 2 wherein said first graphite fibers include fibers which are derived from a pitch precursor; and said second graphite fibers include fibers which are derived from a PAN precursor.

4. The thermocouple device of claim 1 wherein said first and second graphite fibers have different macro-structures and densities.

5. The thermocouple device of claim 1 further comprising an elongated housing in which said first and second strands of graphite fibers are arranged;
    said first and second strands being separated in said housing and terminating at said thermocouple junction adjacent an end of said housing; and
    an insulating material carried within said housing for insulating said first and second strands from one another and for fixing said first and second strands in said separated configuration within said housing.

6. The thermocouple device of claim 5 wherein said insulating material comprises a carbon material having a higher electrical resistance than said first and second graphite fibers comprising said first and second strands respective.

7. In a thermocouple device having first and second thermoelectric elements, a method of production a Seebeck voltage effect for measuring high temperatures wherein the method comprises including a first thermoelectric element a first graphite fiber strand; and including as a second thermoelectric element a second graphite fiber strand characterized in that said graphite fibers of said first and second strands have different thermoelectric characteristics due to said strands being derived from precursor processes and materials having different molecular structures.

8. The method of claim 7 wherein said first strand and said second strand consist of multifilament graphite fibers.

9. The method of claim 8 wherein said first graphite fibers are derived from a pitch precursor process, and said second graphite fibers are derived from a PAN or rayon precursor process.

10. The method of claim 7 further comprising the steps of encapsulating said first and second strands in an insulating material in a configuration in which said first and second strands are separated, except at a point where said first and second strands are joined at a thermocouple junction; and enclosing said insulating material in said first and second strands in a housing.

11. The method of claim 10 wherein said housing is constructed from a material consisting of carbon, molybdenum, tantalum, platinum-rhodium, or Inconel 600.

12. The method of claim 10 wherein said insulating material is chosen from carbon, magnesia, alumina, berylia, or boron nitride.

13. A thermocouple device of the type which includes a first thermoelectric element and a second thermoelectric element, said first and second thermoelectric elements being separated and terminating at a thermocouple junction at a temperature-exposed end of said thermocouple, and the opposing ends of said thermoelectric elements being in electrical communication with a detector means for detecting the difference in thermoelectromotive force between the thermoelectric element at the temperature to which the thermocouple junction is exposed; wherein said first thermoelectric element includes a first strand of graphite fiber, and said second thermoelectric element includes a second strand of graphite fiber wherein said first and second multifilament strands are further characterized in that said graphite fibers of said first and second multifilament strands have different thermoelectrical characteristics produced by deriving said graphite fibers of said first and second strands from generic precursor materials having different molecular structures and processes based on the pyrolysis and polymerization of hydrocarbons so that a Seebeck voltage effect is produced which is sufficiently high and sensitive to produce a thermocouple effect when said thermocouple junction of said first and second strands is subjected to a temperature.

14. The thermocouple device of claim 13 wherein said first and second graphite strands are enclosed within a housing in which said first and second strands extend in a separated configuration, said separated strands joined together at said thermocouple junction adjacent a remote end of said housing which is the temperature-sensing end of said thermocouple; and the remote ends of said first and second graphite fiber strands being connected to said detector means.

15. The thermocouple device of claim 14 further including an insulation material encapsulating said first and second graphite fiber strands within said housing for insulating said first and second strands and for maintaining said first and second strands in said separated configuration as they extend axially along the length of said housing.

16. The thermocouple device of claim 13 wherein said first and second graphite fiber strands of graphite fibers are supported by insulation blocks; said thermocouple junction being disposed between said insulation blocks; and said first and second strands being connected to said detector means on the opposing sides of said insulation blocks remote from said thermocouple junction.

17. The thermocouple device of claim 13 wherein said first and second strands are encapsulated by insulation material including a carbon material having a higher electrical resistance than that of said graphite fibers.

18. The thermocouple device of claim 13 wherein said first and second graphite fiber strands each consist of multifilament graphite fibers.

19. The thermocouple device of claim 18 wherein said first and second graphite fiber strands each consist of a monofilament graphite fiber.

* * * * *